US011429160B2

(12) United States Patent
Tseng et al.

(10) Patent No.: US 11,429,160 B2
(45) Date of Patent: Aug. 30, 2022

(54) ADAPTABLE MULTIPLE CARD SIZES OF RISER CAGE STRUCTURE

(71) Applicant: DELL PRODUCTS L.P., Round Rock, TX (US)

(72) Inventors: Chun-Yang Tseng, Taipei (TW); Hung-Wen Wu, New Taipei (TW)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 16/779,853

(22) Filed: Feb. 3, 2020

(65) Prior Publication Data

US 2021/0240234 A1 Aug. 5, 2021

(51) Int. Cl.
*G06F 1/18* (2006.01)

(52) U.S. Cl.
CPC .................... *G06F 1/185* (2013.01)

(58) Field of Classification Search
CPC ........................................ H05K 7/20
See application file for complete search history.

(56) References Cited

U.S. PATENT DOCUMENTS

| 5,036,473 | A | 7/1991 | Butts et al. |
| 7,088,583 | B2 | 8/2006 | Brandon et al. |
| 7,661,392 | B2 | 2/2010 | Conger et al. |
| 7,734,381 | B2 | 6/2010 | Conger et al. |
| 7,874,268 | B2 | 1/2011 | Conger et al. |
| 9,066,494 | B2 | 6/2015 | Conger et al. |
| 10,448,612 | B2 | 10/2019 | Conger et al. |
| 2003/0043540 | A1* | 3/2003 | Chen .................. H05K 7/20172 361/679.33 |
| 2005/0122703 | A1* | 6/2005 | Fan ...................... H05K 7/1408 361/801 |
| 2011/0072970 | A1 | 3/2011 | Slobodzian et al. |
| 2011/0110051 | A1* | 5/2011 | Chen ...................... G06F 1/186 361/748 |
| 2013/0160716 | A1 | 7/2013 | Conger et al. |
| 2015/0003004 | A1* | 1/2015 | Wu ........................ G06F 1/188 361/679.32 |

FOREIGN PATENT DOCUMENTS

EP 2478761 7/2015

\* cited by examiner

*Primary Examiner* — Jerry Wu

(74) *Attorney, Agent, or Firm* — Jackson Walker LLP; Christopher J. Rourk

(57) ABSTRACT

A chassis for electronic equipment, comprising a front panel, a slot disposed in the front panel and a first computer card latch disposed in the slot, the first computer card latch configured to hold a computer card having a first predetermined height.

18 Claims, 4 Drawing Sheets

ADAPTABLE MULTIPLE CARD SIZES OF RISER CAGE STRUCTURE

TECHNICAL FIELD

The present disclosure relates generally to a chassis for electronic components, and more specifically to an adaptable multiple card size retainer mechanism for a riser cage structure.

BACKGROUND OF THE INVENTION

A chassis for electronic components generally contains a number of cards or other discrete structures. While there is a nominal amount of modularity for such structures, it is often the case that such modularity fails to accommodate all potential variations and may suffer from unexpected problems as a result.

SUMMARY OF THE INVENTION

A chassis for electronic equipment is disclosed that includes a front panel and a slot disposed in the front panel, such as to receive a computer card. A first computer card latch is disposed in the slot and has a low profile that is configured to hold a computer card having a first predetermined height.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
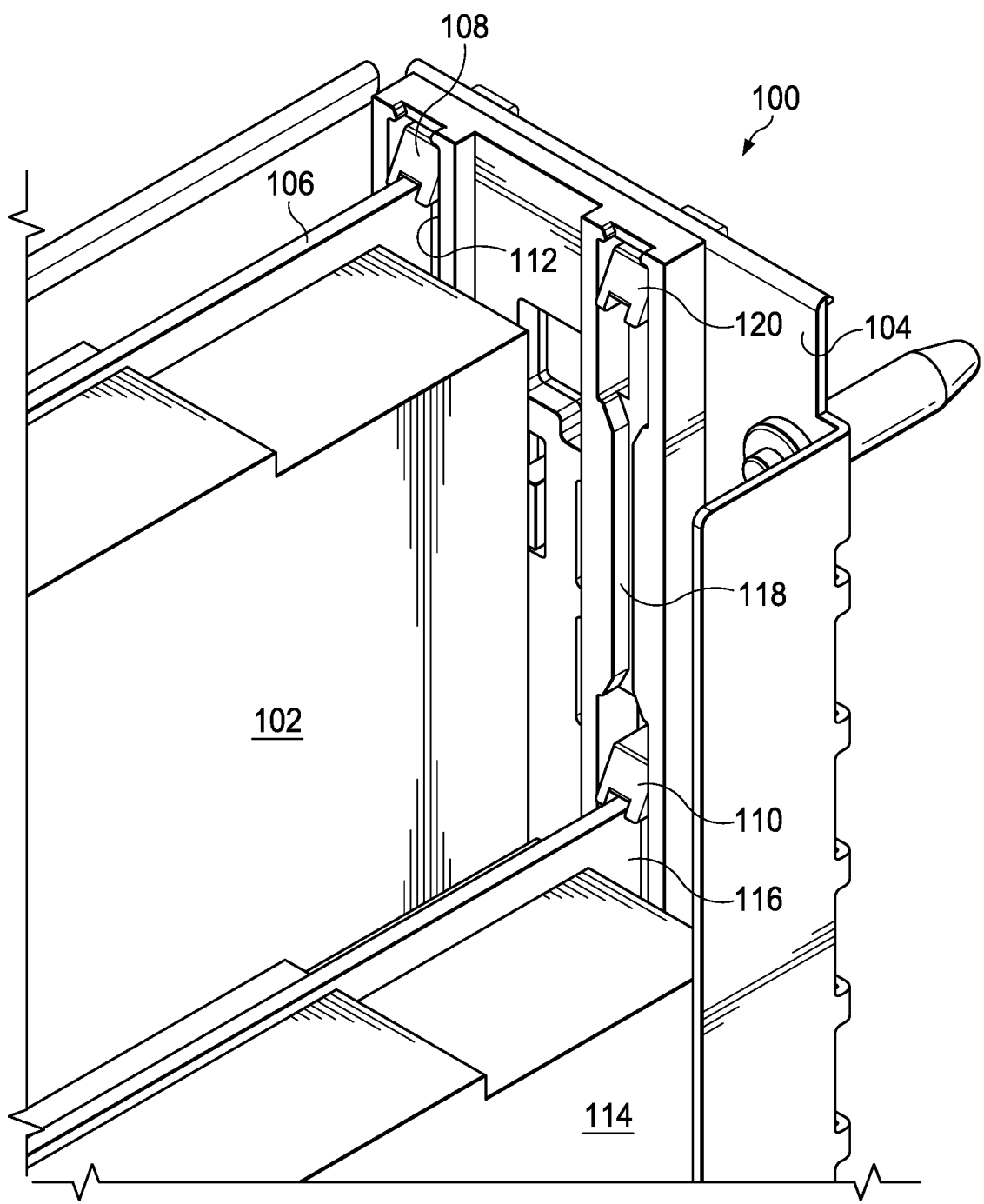
FIG. 1 is a diagram of a computer card interface with a top holder and a bottom holder, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

Peripheral Component Interconnect Express, or PCIe, cards can have different shapes and sizes, which are also referred to as a "form factor. It is a common practice for an equipment manufacturer to provide a PCIe card holder or "cage" that is specifically designed for one each size of PCIe card, and a PCIe card of a different size cannot be installed with a secure fit into the a cage for a different sized PCIe card without creating a risk of card "rock-out," which is the term for when a PCIe card becomes lose and is no longer securely installed and making electrical contact. The availability of PCIe cards with different form factors greatly complicates the various options for PCIe card configuration and the operational effort associated with installing and maintaining PCIe cards.

A card holder with a PCIe card retention capability is mandatory to pass a shock and vibration test without failure caused by card rock-out. When a low profile PCIe card is installed into a full height cage, the shock and vibration test has a high risk to fail with card rock out, because the cage does not contain a solid card vertical retention.

Additional PCIe retention hardware pre-locates designed at the side of cage might be an alternative to solve the issue. However, that alternative increases the difficulty during card install and removal, and creates the possibility of improper set-up of the pre-located card retention hardware either on card installation or removal. In addition, a side retention configuration may detract from the cosmetic appeal or the chassis, and/or increase the chassis cost, can be overlooked and thus be unused, and can be more difficult to remove. These alternative designs also have a higher chance to interfere with adjacent modules/components and a full height size card, such as if users forget to install the side retention back into its locked position. These designs can also lead to problems when seating the cage in or pulling the cage out from the chassis.

The present disclosure provides an adaptive card holder that contains multiple vertical retention devices to support different sizes of cards (such as standard height PCIe cards, low profile PCIe cards or other suitable cards), and avoids card rock during vibration/shock tests that can cause card disconnection and test failure. In an alternative embodiment, multiple separate card holders can be used to provide vertical retention for different card heights or sizes in a single card holder.

The prior art includes holders for full height or low profile cards that have a single sized card holder, and cannot leverage the same card holder for different sized cards without the use of large card holders with a poor form factor that results in wasted space inside of the chassis. The present disclosure can be used with all suitable products, such as products with multiple sizes of add-on cards (such as a PCIe card, a riser card or other suitable cards), offerings in a specific board card slot (fixed or removable module), and can also be used with a card vertical retention to fix the card in a proper position, so as to secure the connection.

FIG. 1 is a diagram of a computer card interface 100 with a top holder 108 and a bottom holder 110, in accordance with an example embodiment of the present disclosure. Computer card interface 100 can be fabricated from sheet metal, molded plastics (such as acrylonitrile butadiene styrene, acrylonitrile styrene acrylester and polycarbonate, polyamide, polycarbonate, polycarbonate and acrylonitrile butadiene styrene, phenolharz, polymethyl methacrylate, Plexiglas, polyphenylene ether, polyphenylene oxide, modified polyether, polystyrene, styrene ethylene butadiene styrene or other suitable plastics), or other suitable materials.

Computer card interface 100 includes full height computer card 102 and support 106, which is configured to slide into slot 112 of front panel 104. Latch 108 is configured to hold support 106. Computer card interface 100 also includes low profile computer card 114 and support 116, which is configured to slide into slot 118 of front panel 104. Latch 110 is configured to hold support 116.

In this example embodiment, front panel 104 can be a single piece construction that is molded to include slot 112, latch 108, slot 118, latch 110 and other components and features, such as penetrations, supports, bushings and so forth. Front panel 104 can be connected to a chassis, such as by bolting, rivets, epoxy, clips or in other suitable manners.

After front panel 104 has been assembled with the chassis, full height computer card 102 and low profile computer card 114 can be installed. In one example embodiment, the specific configuration of computer cards that will eventually be used might not be known until an order is placed and a customer selects features that have corresponding modular computer cards that are installed in the chassis to provide the features. In this example, a full height computer card 102 and a low profile computer card 114 may need to be installed, as shown, or other combinations of cards may be required, such as two full height computer cards 102, two low profile computer cards 114, and so forth. Latch 108 and latch 110 allow these different combinations of computer cards to be installed without a loss of stability. For example, prior art configurations may only include a single latch that is either optionally configured for a full height computer card but which is unable to fully support a low profile computer card. Likewise, a single latch that is configured for a low profile computer card may be provided and might fail to be usable with a full height card, or other similar problems can exist. One reason for these problems is the inability to provide room for multiple latches.

The present disclosure includes latch 108 and latch 110, which are each configured to provide a low profile and to be compatible with either a full height computer card or a low profile computer card. For example, each of latch 108 and latch 110 include a flexible tab that has a sloped surface that is configured to be displaced, to allow either a full height computer card or a low profile computer card to be installed, such as by flexing outwards towards front panel 104, downwards, sideways or in other suitable directions. Each of latch 108 and latch 110 also include a notch that is configured to secure a support associated a computer card, but latch 110 flexes inwards when full height computer card 102 is installed and thus does not prevent the support 106 of full height computer card 102 from being securely locked into the notch of latch 108, as shown. Likewise, latch 120 flexes inward as low profile computer card 114 is installed, but then returns to its resting position as shown, to allow support 116 to be secured by the notch of latch 110.

Once the top of support 106 or support 116 have passed by latch 108 or latch 110, respectively, they can be secured in slot 112 or slot 118, respectively, such as by use of a spring or other mechanical force mechanism, by mating a connector on full height computer card 102 or low profile computer card 114 with a corresponding connector contained within the chassis, or in other suitable manners. In this manner, either of full height computer card 102 or low profile computer card 114 can be secured in either of slot 112 or slot 118, and will not vibrate loose or otherwise lose electrical contact or mechanical stability.

Although two slots and two cards are shown, a suitable number of slots and cards can also or alternatively be used in computer card interface 100, and full height computer cards can be exchanged for low profile computer cards and vice versus during or after the initial configuration. Computer card interface thus provides enhanced flexibility and configurability that is not present in prior art devices due to the excessive space required to provide a feature that can be used to secure different types of cards in a slot.

Figure 2A:
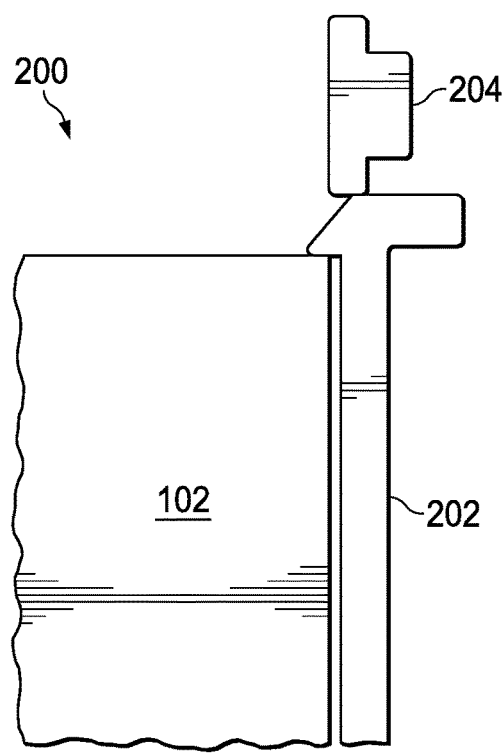
FIGS. 2A through 2C are diagrams of a computer card holder, in accordance with an example embodiment of the present disclosure.
Figure 2B:
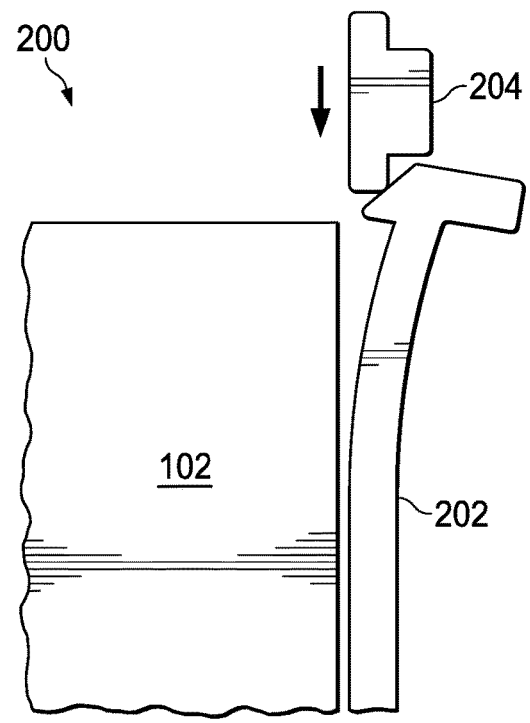
Figure 2C:
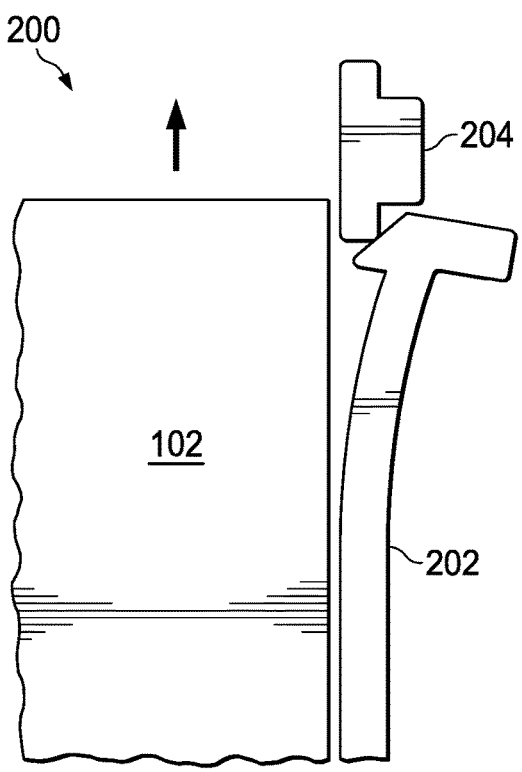

FIGS. 2A through 2C are diagrams of a computer card holder 200, in accordance with an example embodiment of the present disclosure. In FIG. 2A, full height computer card 102 is shown secured by latch 202, and a release control 204 is disposed above latch 202. Latch 202 has a notch that extends over full height computer card 102, and which securely holds full height computer card 102 in position to prevent loss of electrical contact or mechanical stability due to vibration.

FIG. 2B shows release control 204 engaging with latch 202 along the angled surface of latch 202, which forces latch 202 away from full height computer card 202. In this example embodiment, latch 202 includes a flexible straight portion or neck that extends for a predetermined distance and allows latch 202 to bend away from full height computer card 102, such as outwards towards a front panel (not explicitly shown), but in an alternative embodiment, the angled surface of latch 202 can be configured to fold inwards towards the neck, sideways, or other suitable configurations can also or alternatively be used that allow a computer card to be installed.

FIG. 2C shows full height computer card 202 moved upwards past the bottom corner of release control 204, so as to allow full height computer card 102 to be removed. The low profile of latch 202 and release control 204 allows computer cards of different sizes to be accommodated without modification or customization, which is an important technical feature of the present disclosure.

Figure 3A:
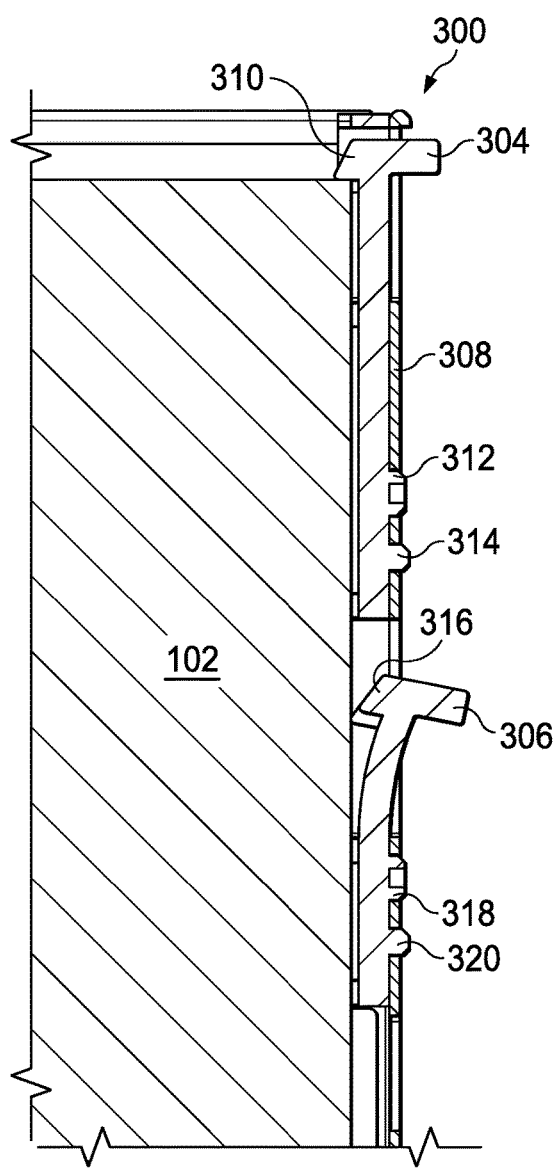
FIGS. 3A and 3B are diagrams of a computer card interface with a top holder and a bottom holder, in accordance with an example embodiment of the present disclosure.
Figure 3B:
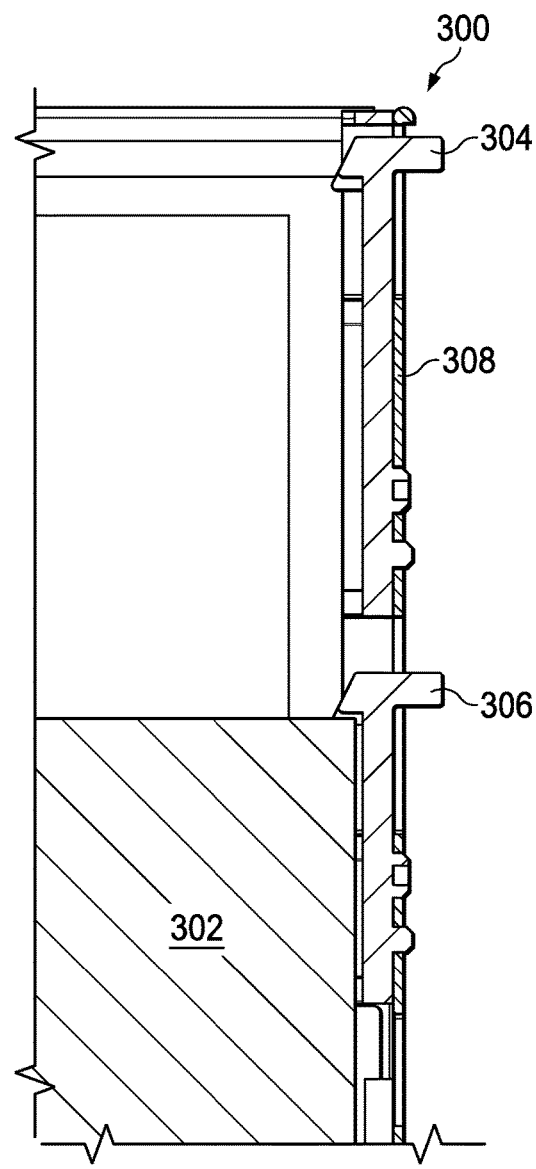

FIGS. 3A and 3B are diagrams of a computer card interface 300 with a top holder 304 and a bottom holder 306, in accordance with an example embodiment of the present disclosure. FIG. 3A includes latch 304 and latch 306, which are disposed in front panel 308. Latch 304 includes a slanted notch 310, which extends over the edge of full height computer card 102 and holds it securely in position. Latch 304 also includes fastener 312 and fastener 314, which are used to secure latch 304 to front panel 308. In one example embodiment, fastener 312 and fastener 314 can be molded features of latch 304 that are configured to interface with features on front panel 308, and the features on front panel 308 can be punched from metal, molded from plastic or otherwise suitably formed.

Latch 306 includes a slanted notch 316, which has been moved out from the side of full height computer card 102, such as by manually manipulating latch 306 or by inserting full height computer card 102 past slanted notch 316. Latch 306 also includes fastener 318 and fastener 320, which are used to secure latch 306 to front panel 308. In one example embodiment, fastener 318 and fastener 320 can be molded features of latch 306 that are configured to interface with features on front panel 308, and the features on front panel 308 can be punched from metal, molded from plastic or otherwise suitably formed.

FIG. 3B includes low profile computer card 302, which is held in position by latch 306. The configuration of latches 304 and 306 allow low profile computer card 302 to be easily installed, and also allow low profile computer card 302 to be removed and a different computer card can then be installed, such as full height computer card 102 or other suitable computer cards. The low profile of latch 304 and latch 306 allows computer cards of different sizes to be accommodated without modification or customization, which is an important technical feature of the present disclosure.

Figure 4:
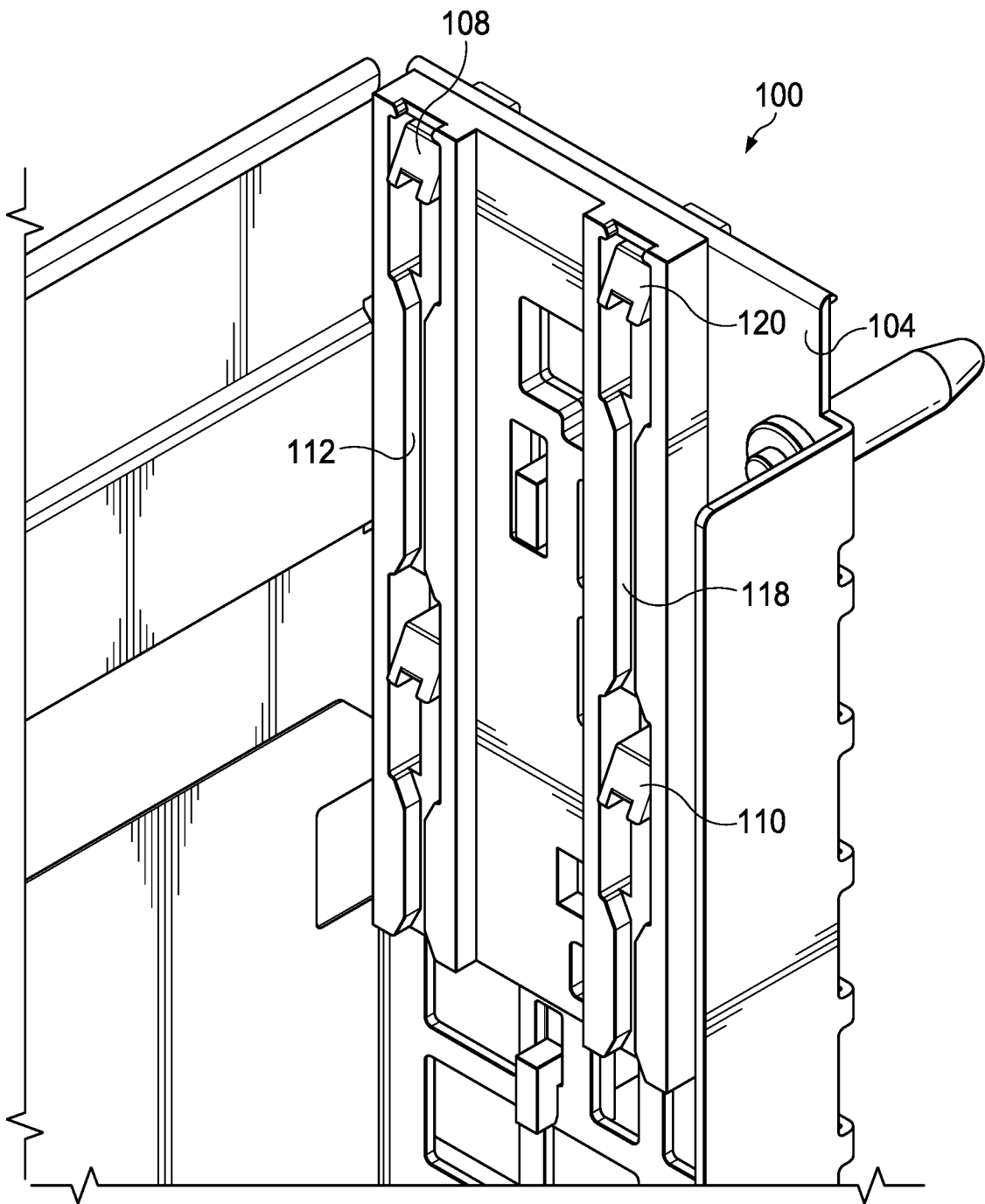
FIG. 4 is a diagram of a computer card chassis with a top holder and a bottom holder, in accordance with an example embodiment of the present disclosure.

FIG. 4 is a diagram of a computer card interface 100 with a top holder 108 and a bottom holder 110, in accordance with an example embodiment of the present disclosure. Computer card interface 100 includes slot 112, latch 108, slot 118, latch 110 and front panel 104 without any installed computer cards.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A chassis for electronic equipment, comprising: a front panel connected to the chassis; a slot disposed on an inner surface of the front panel; a first computer card latch flexibly disposed in the slot, the first computer card latch configured to hold a first computer card having a first predetermined height when the first computer card is inserted into a connector contained within a bottom of the chassis; and a second computer card latch flexibly disposed in the slot at a second location underneath the first computer card latch, wherein the second computer card latch is configured to hold a second computer card when the second computer card is inserted into the connector; the second computer card having a second predetermined height that is less than the first predetermined height; wherein each of the first and second computer card latches comprises a slanted surface that causes the first and second computer card latches to be pushed away by the first computer card when it is being installed along the slot.

2. The chassis of claim 1, wherein the first computer card latch comprises a notch that interfaces with the computer card having the first predetermined height.

3. The chassis of claim 1, wherein the second computer card latch comprises a notch that interfaces with the computer card having the second predetermined height.

4. The chassis of claim 1, wherein the second computer card latch comprises a slanted surface that causes the second computer card latch to be pushed out of a path of the computer card having the second predetermined height when it is being installed.

5. The chassis of claim 1, wherein the second computer card latch comprises a slanted surface that causes the second computer card latch to be pushed out of a path of the computer card having the second predetermined height when it is being installed and to be pushed out of a path of the computer card having the first predetermined height when it is being installed.

6. The chassis of claim 1, wherein the first computer card latch comprises a fastener that is configured to interface with a feature on the front panel to secure the first computer card latch to the front panel while allowing the first computer card latch to flexibly move.

7. The chassis of claim 1, wherein the second computer card latch comprises a fastener that is configured to interface with a feature on the front panel.

8. The chassis of claim 1, wherein the first computer card latch comprises a plurality of fasteners that are each configured to interface with a feature on the front panel to secure the first computer card latch to the front panel.

9. The chassis of claim 1, wherein the first computer card latch comprises a flexible portion that is configured to allow a notch of the first computer card latch to be displaced.

10. The chassis of claim 1, wherein the second computer card latch comprises a flexible portion that is configured to allow a notch of the second computer card latch to be displaced.

11. The chassis of claim 1, wherein the first computer card latch comprises a notch disposed on a flexible portion that is configured to allow the notch of the first computer card latch to be displaced.

12. The chassis of claim 1, wherein the second computer card latch comprises a notch on a flexible portion that is configured to allow the notch of the second computer card latch to be displaced.

13. The chassis of claim 1, wherein the first computer card latch comprises a notch on a flexible portion, wherein the notch includes a slanted portion that is configured to allow the notch of the first computer card latch to be displaced when a computer card is installed.

14. The chassis of claim 1, wherein the second computer card latch comprises a notch on a flexible portion, wherein the notch includes a slanted portion that is configured to allow the notch of the second computer card latch to be displaced when a computer card is installed.

15. The chassis of claim 1, further comprising one or more additional slots disposed adjacent to the slot.

16. The chassis of claim 1, further comprising one or more additional slots disposed adjacent to the slot, each additional slot having an associated computer card latch disposed within.

17. The chassis of claim 1, further comprising one or more additional slots disposed adjacent to the slot and wherein the computer card latch is disposed within the slot and outside of the one or more additional slots.

18. The chassis of claim 1 wherein the first computer card latch is configured to hold a corner of the computer card.

\* \* \* \* \*